United States Patent [19]

Hyde et al.

[11] 4,065,177
[45] Dec. 27, 1977

[54] INFANT CARRIER ASSEMBLY

[75] Inventors: Richard E. Hyde, Palos Verdes; Lee T. Carmichael, Pasadena, both of Calif.

[73] Assignee: California Strolee, Inc., Compton, Calif.

[21] Appl. No.: 745,183

[22] Filed: Nov. 26, 1976

[51] Int. Cl.² .............................................. B62B 7/08
[52] U.S. Cl. .................................. 297/327; 280/642; 280/47.38; 297/92; 297/357; 280/31
[58] Field of Search ................. 280/47.38, 47.39, 647, 280/648, 30, 31; 296/1 B; 297/357, 327, 92, 93

[56] References Cited

U.S. PATENT DOCUMENTS

| 2,480,552 | 8/1949  | Colvez    | 297/93      |
|-----------|---------|-----------|-------------|
| 3,550,998 | 12/1970 | Boudreau  | 280/47.38 X |
| 3,961,803 | 6/1976  | Fleischer | 280/47.38   |

Primary Examiner—Robert R. Song
Attorney, Agent, or Firm—Lyon & Lyon

[57] ABSTRACT

Disclosed herein is an infant carrier assembly having an infant carrier which is mounted to the carrier frame by means of brackets and pins such that the infant seat may rest in a variety of positions or in some embodiments may be removed from the carrier frame to be used to carry the infant about.

8 Claims, 7 Drawing Figures

INFANT CARRIER ASSEMBLY

BACKGROUND OF THE INVENTION

The invention herein relates to infant carrier assemblies such as strollers, carriages, car seats and the like. The invention is particularly adaptable to infant strollers of the collapsible, portable type.

When using such strollers to transport infants about, it is often desirable to remove the infant from the stroller and place it in a more convenient position. For example, when shopping it is desirable and more convenient to have the infant in the shopping cart rather than in a separate stroller. Similarly, at a beach or on rough surfaces, it is often necessary to remove the infant from the stroller and carry it since the wheeled stroller will not negotiate the inappropriate terrain.

It has also been observed, that some infants can only be or prefer to be transported in a reclining position while others prefer to be transported in a more upright position. In addition, the same infant may prefer different positions at different times.

Therefore, it is desirable that an infant stroller, car seat or the like, have the flexibility to transport the infant in a variety of positions. It is further desirable to provide means for removing the infant from the carrier assembly in such a manner that any disturbance which might upset or awake the infant is minimized. Lastly, it is desirable to provide means which safely and securely support the infant both in the carrier assembly and when the infant is removed from the supporting frame.

These and other advantages are obained by the infant carrier assembly of the invention herein.

SUMMARY OF THE INVENTION

The invention herein is an infant carrier assembly comprising a frame, an infant carrier or seat, and brackets and pins connecting the carrier and the frame. The frame may be any of those types commonly in use such as baby carriages, trams, strollers, portable strollers, car seats and the like. Although all such carrier assemblies are within the scope of the invention herein, it will be further described in terms of one preferred embodiment, wherein the frame comprises a collapsible, easily transportable stroller assembly.

The infant carrier or seat is movably, and also preferably removably, supported on the frame by a system of pins and channeled brackets. In one preferred embodiment, pins extend from the infant carrier to engage channels in brackets mounted to the frame. It is to be understood that it is as well within the scope of the invention to mount the brackets on the seat and the pins on the frame or one bracket on the seat and one set of pins on the corresponding frame.

The channel means in the bracket comprise, generally, a first arcuate path for receiving and retaining one pin from each set of pins and a second substantially linear path for receiving and retaining at least another pin of each set of pins. The substantially linear path may extend within or without the arch of the arcuate path such that the configuration of the channel means will be generally "mushroom" in shape, viz., $\top$, or generally "Y" shaped.

The selection of the particular configuration best suited for an individual stroller assembly is well within the purview of those skilled in the art. In some preferred embodiments of the invention, the substantially linear channel connects with the arcuate channel at one end and is open at the other to receive the pins in a sliding engagement such that the infant carrier may be readily placed in and removed from the frame of the stroller.

DETAILED DESCRIPTION OF THE INVENTION

Figure 1:
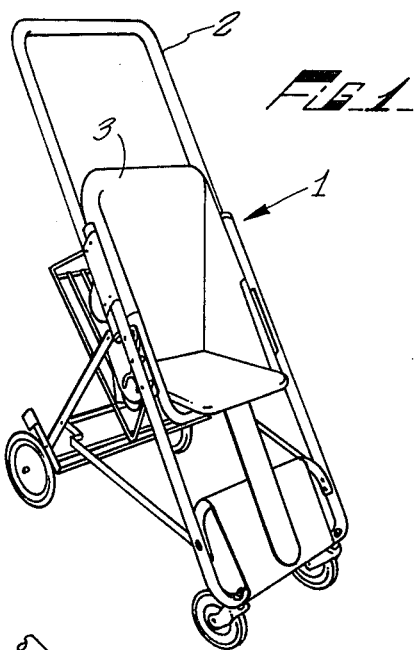
FIG. 1 is a schematic view of one preferred embodiment of the invention comprising a collapsable infant stroller assembly.

The invention will be further described and discussed in terms of a preferred embodiment depicted in FIG. 1 wherein stroller assembly 1 comprises collapsible frame 2 and infant carrier 3. Carrier 3 is movably and removably mountd to frame 2 by a symmetrical set of pins and channeled brackets according to the invention. For convenience only one side of the symmetrical arrangement will be described herein, it being understood that in this embodiment the other side is identical in configuration and function.

Figure 6:
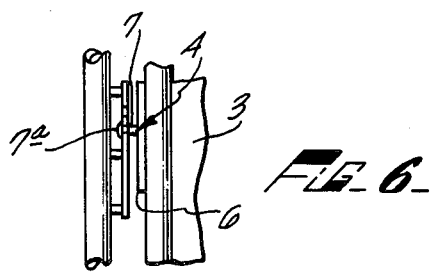
FIG. 6 is a detail taken in the direction of line 6—6.

The arrangement of the pins and brackets is shown in more detail in FIGS. 2-6. In this embodiment, pins 4 and 5 extend from plate 6 which is secured to one side of carrier 3. As shown by FIG. 6, pin 4 is comprised of shaft portion 7 and head portion 7a on the end thereof remote from plate 6. Pin 5 has identical shaft and shoulder portions.

Bracket 8 is mounted to support members 9 and 10 of frame 2 and is provided with channel means 11 therein which is comprised of arcuate path 12 and substantially linear path 13 extending toward and away from arcuate path 12. In the embodiment shown, paths 12 and 13 are joined at junction point 14 and linear path 13 is open at end 15 which is at the end of path 13 remote from junction point 14.

Figure 2:
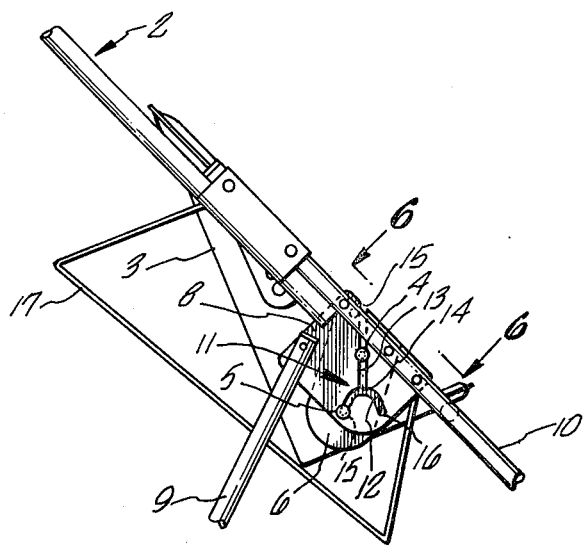
FIG. 2 is a detail depicting the stroller of FIG. 1 wherein the infant seat is in a raised forward-facing position.
Figure 3:
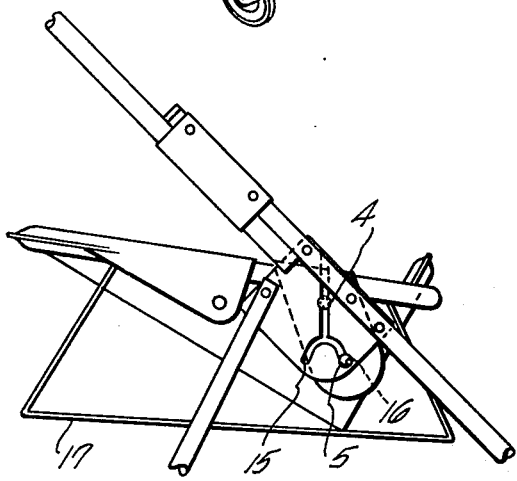
FIG. 3 is a detail depicting the stroller of FIG. 1 wherein the infant seat is in a lowered forward-facing position.

Pins 4 and 5 are positioned on plate 6 such that when carrier 3 is being placed in frame 2 the shaft portions of the pins initially engage path 13 of channel means 11. The carrier then may be mounted so that pin 5 is placed at end 15 of arcuate path 12 and pin 4 is positioned within the run of path 13. The carrier will then be in a substantially upright forward facing position as shown in FIG. 2. Alternatively, carrier 3 may be inserted such that pin 5 is positioned at end 16 of arcuate path 12 and pin 4 is positioned within the run of substantially linear paths 13 whereby the carrier is in a reclining forward facing position as shown in FIG. 3.

It will be apparent that plate 6 and its opposite plate are positioned a sufficient distance apart on carrier 3 so as to engage the channel means of bracket 8 and its opposite bracket. The minimum separation of the plates will be a distance sufficiently great to allow carrier 3 to be wide enough to comfortably carry both newborn and larger infants. The determination of this distance for particular embodiments of the invention is well within the purview of those skilled in the art. For example, it is within the scope of the invention to provide a carrier suitable for simultaneously transporting two infants. In that case either the carrier seat would be at least twice as wide or two side-by-side carrier seats with corresponding additional pin and bracket means would be provided.

It is a feature of the invention that the infant carrier containing the seated infant may be changed from an upright to a reclining position without removing it from the frame and with a minimum of distrubance to the infant. Thus, where the infant carrier is in the substantially upright position just described, if the carrier is raised upward and rotated so that pin 5 passes through junction point 14 to rest at end 16 of path 12, the infant carrier will be secured in a substantially reclining positon. To facilitate this action, it is preferred that the length of substantially linear path 13 be at least as long as and prefereably longer than the linear distance separating pins 4 and 5.

It is another feature of the embodiment of the invention depicted in FIGS. 1–6 that the infant carrier, containing the infant, may be entirely removed from frame 2 by simply lifting and rotating the infant carrier whereby pin 5 passes along arcuate path 12, through junction point 14 and up and out of substantially linear path 13. In this embodiment of the invention it is advantageous to supply the infant carrier with a rack assembly 17 on the back thereof which function as a stand for the infant carrier when it is removed from frame 2. Such a rack assembly may also be advantageously used as storage means for diapers, rattles and the like.

As mentioned above, some infants often indicate a desire to alter their mode of travel. In addition, in some circumstances, such as after feeding, parents may also want to keep a more direct eye on the infant's face. It is a feature of the invention herein that infant carrier 3 may be placed within frame 2 in a rearward as well as a forward facing position. In this configuration depicted in FIGS. 4 and 5 pins 18 and 19 which are opposite pins 4 and 5 and extend from plate 20, engage the channel means in bracket 8 while pins 4 and 5 engage the channel means of the opposite bracket.

Figure 4:
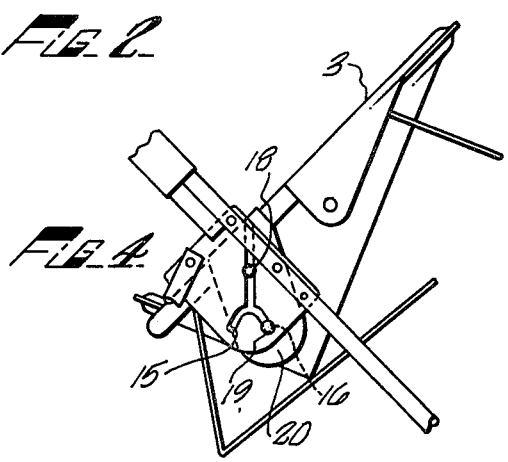
FIG. 4 is a detail depicting the stroller of FIG. 1 whereas the infant seat is in a raised rearward-facing position.
Figure 5:
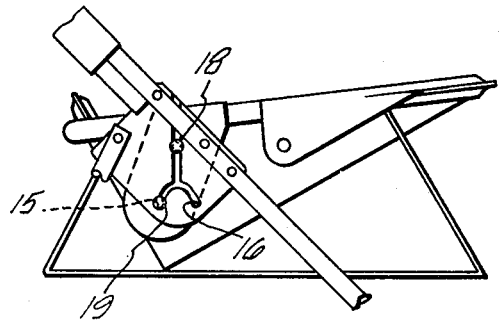
FIG. 5 is a detail depicting the stroller of FIG. 1 wherein the infant seat is in a lowered rearward-facing position.

Thus by performing the operations described above, infant carrier 3 may be adjusted so that pin 19 engages end 16 of path 12 while pin 18 is positioned within the run of path 13. This configuration results in the infant carrier being in a substantially upright rearward facing position as shown in FIG. 4. Similarly, by moving pin 19 to end 15 by the rotation step described above, the infant carrier may be adjusted to a rearward facing reclining position, as shown in FIG. 5.

By the invention herein, a single stroller assembly may accommodate infants from the newborn size, who can only travel in a reclining position, to a much more mature size who are able to travel in an upright position. Furthermore, the choice of four positions allows the parents and the infant more flexibility in determining comfortable traveling and observation positions. Lastly, the infant carrier may be entirely removed from the stroller asssembly for easy transport of the infant in situations, such as shopping or at the beach, where it is inconvenient, or impossible, to transport the entire stroller assembly.

Figure 7:
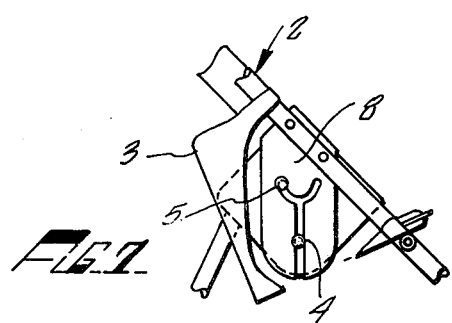
FIG. 7 is a cutaway view of an alternate embodiment of the invention looking out from inside the infant carrier.

It will be readily appreciated that other equivalent arrangements of the support pins, the channeled brackets, and the pathways of the channel means therein will be readily apparent to those skilled in the art. For example, pins 4 and 5 could be fixed to the frame 2 while bracket 8 and its counterpart could be fixed to the infant carrier such as shown in FIG. 7.

Similarly, other desirable motion could be obtained by having substantially linear path 13 extend from the inside of the arch of arcuate path 12 such that the channel means assumed an upright or inverted "mushroom" configuration. It will further be appreciated that it is not necessary to the practice of the invention herein that path 13 join path 12 since either the pins could have fixed travel within the channel means if it is not desired to have a removable infant carrier; or other removal means, such as enlargements in the pathways at appropriately spaced points, could be used for providing placement of the pins in and removal of the pins from the pathways. Lastly, it is not necessary to the invention herein that the pins and channeled brackets of the invention form part of a stroller assembly. The infant carrier of the invention could as well comprise an infant carseat. In that case the frame would be the car seat frame and the infant carier would be mounted therein. By this embodiment it would be possible to have a carseat frame mounted in each family car with the infant seat being easily transferable from one car to another, to the home or for shopping and the like. All such alternate embodiments of the invention are intended to be within the scope hereof.

The present embodiments of this invention are thus to be considered in all respects as illustrative and not restrictive, the scope of the invention being indicated by the appended claims rather than by the foregoing description. All changes which come within the meaning and range of equivalency of the claims therefore are intended to be embraced therein.

We claim:

1. An infant carrier assembly comprising:
   a frame;
   an infant carier;
   first and second sets of pins extending from one of said frame and said carrier;
   first and second brackets, each having channel means therein, mounted on the other of said frame and said carrier, said first bracket being positioned to receive one of said first and said second sets of pins in the channel means therein and said second bracket being positioned to receive the other of said first and said second sets of pins in the channel means therein;
   each said channel means having a first path for receipt of one pin of said first and said second sets of pins and a second path for receipt of a second pin of the same set of said first and said second sets of pins, said first path being arcuate and said second path being substantially linear and extending toward and away from said arcuate path.

2. The carrier assembly of claim 1 wherein each of said linear paths and said arcuate paths is adapted to removably receive said sets of pins.

3. The carrier assembly of claim 2 wherein in each said bracket, one end of each said linear path connects with said arcuate path and the other end thereof is open for removable receipt of said pins whereby said infant carrier may be supported in said frame in a raised forward facing position, a reclining forward facing psotiion, a raised rearward facing position and a reclining rearward facing position.

4. The carrier assembly of claim 1 wherein, in each said bracket, said substantially linear path connects at one end thereof with said arcuate path.

5. The carrier assembly of claim 4 wherein the other end of each said linear path is open for removable receipt of said first and second pins of said sets of pins.

6. The carrier assembly of claim 5 wherein each said channel means are identically substantially Y shaped.

7. An infant carrier assembly comprising:
a frame;
an infant carrier removably and movably supported on said frame by support means comprising (1) first and second sets of pins extending from one of said frame and said carrier, (2) first and second brackets, mounted on the other of said frame and said carrier, and (3) channel means within each said bracket;
said first bracket being positioned to receive one of said first and said second sets of pins in the channel means therein and said second bracket being positioned to receive the other of said first and said second sets of pins in the channel means therein;
each said channel means having a first path for receipt of at least one pin of said first and said second sets of pins and connecting therewith a second path for receipt of a second pin of the same set of said first and said second pins, said first path being arcuate and said second path being substantially linear and extending toward and away from said arcuate path with the end of each said linear path extending away from each said arcuate path being open for removable receipt of said pins.

8. The carrier assembly of claim 7 wherein said channel means are substantially identical and substantially Y shaped.

* * * * *